(12) United States Patent
Das et al.

(10) Patent No.: US 11,223,613 B2
(45) Date of Patent: Jan. 11, 2022

(54) METHODS AND SYSTEMS FOR ROLES AND MEMBERSHIP MANAGEMENT IN A MULTI-TENANT CLOUD ENVIRONMENT

(71) Applicant: Ingram Micro Inc., Irvine, CA (US)

(72) Inventors: Swarup Das, West Bengal (IN); David Hou Chang, Palo Alto, CA (US); David Wippich, Irvine, CA (US)

(73) Assignee: CloudBlue LLC, Irvine, CA (US)

( * ) Notice: Subject to any disclaimer, the term of this patent is extended or adjusted under 35 U.S.C. 154(b) by 0 days.

(21) Appl. No.: 16/291,975

(22) Filed: Mar. 4, 2019

(65) Prior Publication Data

US 2019/0199708 A1 Jun. 27, 2019

Related U.S. Application Data

(63) Continuation-in-part of application No. 14/268,332, filed on May 2, 2014, now abandoned.

(51) Int. Cl.
| | |
|---|---|
| *G06F 15/173* | (2006.01) |
| *H04L 29/06* | (2006.01) |
| *G06F 9/455* | (2018.01) |
| *H04L 12/64* | (2006.01) |

(52) U.S. Cl.
CPC ...... *H04L 63/0815* (2013.01); *G06F 9/45558* (2013.01); *H04L 12/6418* (2013.01); *H04L 63/105* (2013.01); *H04L 63/108* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 7,921,299 B1 * | 4/2011 | Anantha | G06F 21/53 705/51 |
| 2008/0191009 A1 * | 8/2008 | Gressel | G07C 9/27 235/382 |
| 2010/0306775 A1 | 12/2010 | Appiah | |
| 2011/0270885 A1 | 11/2011 | Vieira | |
| 2012/0072716 A1 | 3/2012 | Hu | |
| 2012/0102539 A1 | 4/2012 | Robb | |
| 2012/0110055 A1 * | 5/2012 | Van Biljon | G06Q 30/04 709/201 |
| 2013/0174275 A1 * | 7/2013 | Micucci | H04L 67/1044 726/28 |
| 2013/0191896 A1 * | 7/2013 | Adderly | H04W 12/06 726/6 |

(Continued)

*Primary Examiner* — Phyllis A Book
(74) *Attorney, Agent, or Firm* — Ice Miller LLP

(57) ABSTRACT

Systems and methods for allowing one or more users to access a number of tenant systems in a multi-tenant cloud environment are disclosed. The method includes registering a user to the tenant systems based on an identity information received from the user. The same identity information is associated with each of the tenant systems. The method also includes creating an account corresponding to each of the tenant systems for the user. The method further includes allowing the user to access one or more of the tenant systems based on the identity information entered by the user. The user accesses the tenant systems by entering the same identity information. Further, the same identity information is used for identifying the user in each of the tenant systems.

10 Claims, 6 Drawing Sheets

(56) References Cited

U.S. PATENT DOCUMENTS

| | | | |
|---|---|---|---|
| 2013/0318590 A1* | 11/2013 | Matsugashita | H04L 63/0815 726/8 |
| 2013/0346389 A1* | 12/2013 | Yancey | G06F 16/176 707/714 |
| 2014/0068732 A1* | 3/2014 | Hinton | G06F 21/41 726/6 |
| 2014/0075565 A1* | 3/2014 | Srinivasan | H04L 41/5054 726/26 |
| 2014/0090037 A1* | 3/2014 | Singh | G06F 21/335 726/7 |
| 2014/0101299 A1* | 4/2014 | Cherel | H04L 41/5051 709/223 |
| 2015/0019559 A1* | 1/2015 | Maquaire | G06F 16/907 707/740 |
| 2015/0180948 A1* | 6/2015 | Shao | H04L 67/20 709/203 |
| 2015/0256474 A1* | 9/2015 | Ringdahl | G06F 9/46 709/226 |
| 2016/0044035 A1* | 2/2016 | Huang | H04L 63/0272 726/4 |
| 2016/0335118 A1* | 11/2016 | Beiter | G06F 9/468 |

* cited by examiner

METHODS AND SYSTEMS FOR ROLES AND MEMBERSHIP MANAGEMENT IN A MULTI-TENANT CLOUD ENVIRONMENT

CROSS-REFERENCE TO RELATED APPLICATION

The present application is a continuation-in-part of, and claims the priority benefit of U.S. application Ser. No. 14/268,332, filed May 2, 2014, the text and drawings of which are hereby incorporated in its entirety.

FIELD OF THE DISCLOSURE

This disclosure relates to cloud networks and more specifically to methods and systems for roles and membership management in a multi-tenant cloud environment/network.

BACKGROUND OF THE DISCLOSURE

In the multi-tenant cloud environment, which is essentially the fabric of hosted (cloud based) applications, each user (equivalent to a customer account hosted in the cloud based system) is given a personal space of its own. User accounts are created in each tenant system and the user may have access to operate within that tenant system only. But at times, it is necessary to have one human user access multiple tenant accounts to perform legitimate operations. The existing system and solutions mandates that the user gets as many user login accounts as the number of tenant systems the user needs to operate in. This may become very cumbersome and unmanageable for the user.

In a multi-tenant cloud environment, many users or tenant systems can host their respective resources/services, and sensitive data, which legitimately belong to the users or tenant systems only. Typically, in a multi-tenant cloud environment, various complex business and security rules are required or implemented to allow an end user to access resources of another tenant system to which the end user doesn't belong. Further, in some scenarios, the user may require cross tenant access. Existing IT systems deploy complex protocols for allowing cross tenant access to resources and also for allowing rights to perform tasks on behalf of the user in the tenant system. These protocols often involve exchanging digital certificates, delegation rights, and time bound expiration of the access rights. Such an implementation is typically deployed in IT setup that involves heterogeneous and distributed components which are usually supplied by multiple vendors. For single vendor solution, such an infrastructure is an overkill and unviable. Some IT systems issues individual credentials to the user for every tenant system the user needs to access or register. This means the user has to remember many login credentials in order to access multiple tenant systems/accounts. In some multi-tenant cloud environment, the user is given impersonation rights to perform tasks on behalf of other users. The problem with such a solution is the fact that impersonation in such a fashion is often a security risk and may lead to unintended exposure to sensitive data.

Therefore, in light of above discussion and limitations with conventional systems, there exists need for techniques to allow users to access multiple tenant systems in a multi-tenant cloud environment or network.

SUMMARY OF THE DISCLOSURE

An embodiment of the present disclosure provides a method for allowing one or more users to access a number of tenant systems in a multi-tenant cloud environment. The method includes registering a user to the tenant systems based on an identity information received from the user. The same identity information is associated with each of the tenant systems. The method also includes creating an account corresponding to each of the tenant systems for the user. The method further includes allowing the user to access one or more of the tenant systems based on the identity information entered by the user. The user accesses the tenant systems by entering the same identity information. Further, the same identity information is used for identifying the user in each of the tenant systems.

Another embodiment of the present disclosure provides a system for allowing one or more users to access a number of tenant systems in a multi-tenant cloud environment. The system includes a tenant registration module for registering a user to the tenant systems based on an identity information received from the user. The same identity information is associated with each of the tenant systems. The tenant registration module creates an account corresponding to each of the tenant systems for the user. The system also includes an access module for allowing the user to access one or more tenant system of the tenant systems based on the identity information entered by the user. The user accesses the tenant systems by entering the same identity information. The same identity information is used for identifying the user in each of the tenant systems. The user rights in a given tenant system is controlled by the roles given to each of the users in the context of that tenant system which can be different from the roles in another tenant system.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present disclosure, reference will be made to the following Detailed Description, which is to be read in association with the accompanying drawings, wherein.

DETAILED DESCRIPTION OF THE DISCLOSURE

The following detailed description is provided with reference to the figures. Exemplary, and in some case preferred, embodiments are described to illustrate the disclosure, not to limit its scope, which is defined by the claims. Those of ordinary skill in the art will recognize a number of equivalent variations in the description that follows.

In the multi-tenant cloud environment, each tenant (equivalent to a customer account hosted in the cloud based system) is given a personal space of its own. In complete disclosure, for description purposes, a tenant refers to a user registered to one or more tenant system. User accounts are created in each tenant system and the user may have access to operate within that tenant system only. In existing environment, a user is given multiple accounts to get membership to more than one tenant system to manage their activities in multi-tenant cloud environment. This implies that the user has to remember so many login credentials, such as login ID, password, and so forth, corresponding to multiple accounts for logging in to multiple tenant systems. This may be very cumbersome and unmanageable from administration point of view for the user.

The present disclosure solves the above mentioned problems by providing methods and systems for allowing a user to become member of multiple tenant systems in a multi-tenant cloud environment with only one identity information. The present disclosure allows the user to access any of the tenant systems to which the user is given membership to, by using same user account and same identity information. Further, when the user is a member of multiple tenant systems then the user may be prompted to choose one of the tenant systems.

The presently disclosed subject matter dramatically reduces the complexity by introducing two simple concepts, i.e., memberships and native versus external users. By virtue of this, the user is neither required to remember multiple identity information (or login credentials) nor needs to be given impersonation rights or digital certificates. In a hosted multi-tenant cloud environment, a service provider may create a tenant account for every customer/user the service provider sells hosted services to. Typically, the operations team and the sales agents of the service provider need to be given rights to perform tasks on behalf of the users (tenants). It is also possible that a user has multiple tenant accounts in the system and hence the user may need access to all the tenant accounts created for the user.

Figure 1:
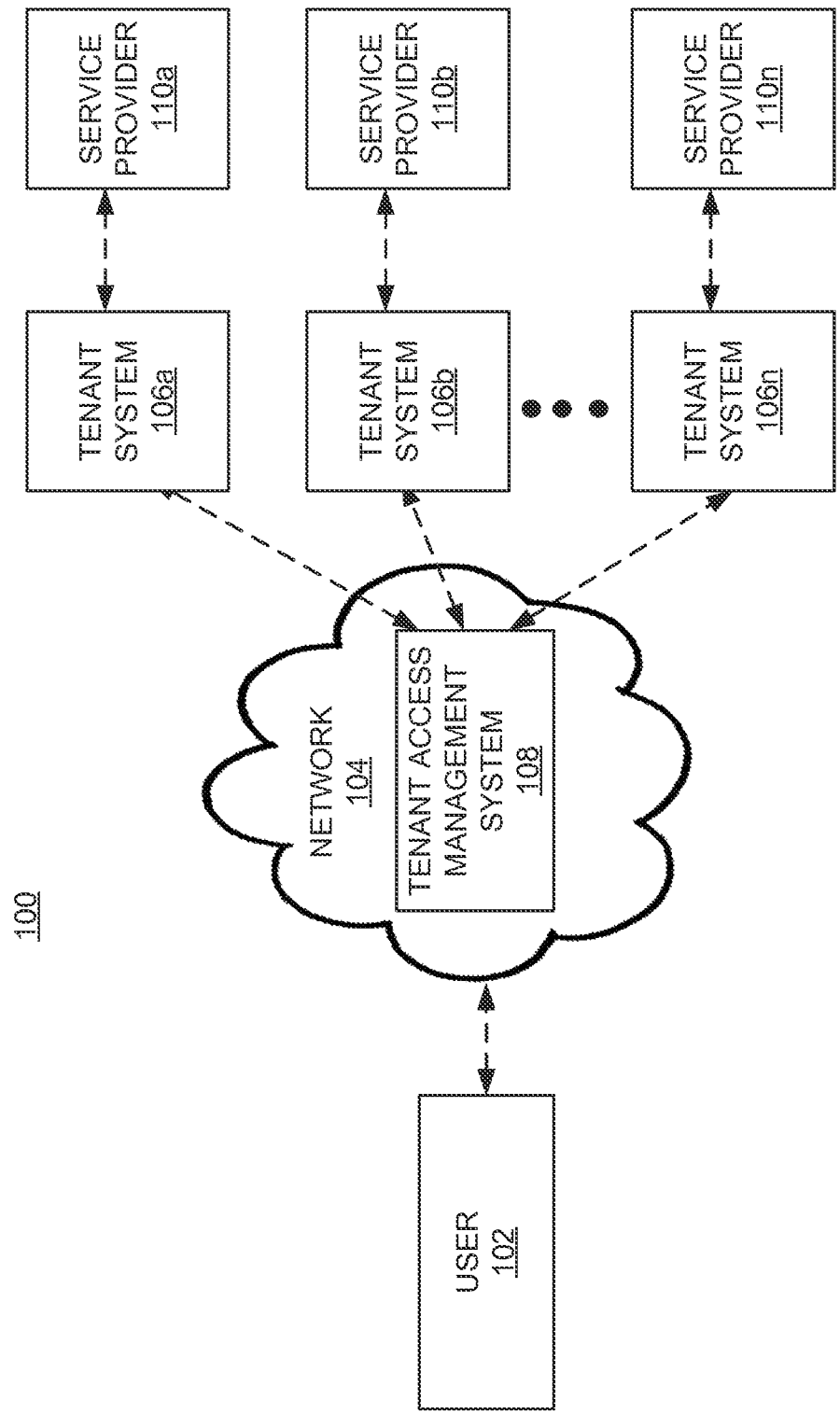
FIG. 1 illustrates an environment where various embodiments of the present disclosure can function.

FIG. 1 illustrates an environment 100 where various embodiments of the present disclosure can function. As shown, the environment 100 includes a user 102 and multiple tenant systems 106a-106n. It will be appreciated, that the environment 100 can include more than one user 102. The environment 100 can be a multi-tenant cloud environment 100. Each of the multiple tenant systems 106a-106n is configured to provide or host one or more resources and services to the user 102 (or users) present in a network 104. The network 104 can be a local area network (LAN), a wide area network (WAN), the Internet, and so forth. The multiple tenant systems 106a-106n have associated service providers 110a-110n. The service providers 110a-110n can provide one or more services or resources to the user 102 or other users in the network 104. The user 102 may be given access tenant systems 106a-106n either on permanent basis or on temporary basis, i.e., for a particular time period.

The user 102 can register to or become a member of one or more of the tenant systems 106a-106n by providing one or more details or identity information. The user 102 can register to each of the tenant systems 106a-106n by using same identity information. Examples of the identity information include, but are not limited to, a username, a password, a telephone number, an email identity (ID), and so forth. The registering of the user 102 can be moderated and verified by the associated service provider(s) 110a-110n of the multiple tenant systems 106a-106n.

The user 102 has an associated device (not shown), and through which the user 102 can access one or more resource(s) and/or service(s) associated with the tenant system(s) 106a-106n to which the user 102 is registered. The device can be a suitable device capable of connecting or communicating with the multiple tenant systems 106a-106n via the network 104. Examples of the device may include, but are not limited to, a mobile phone, a smart phone, a tablet computer, a laptop computer, a desktop computer, any handheld communication device, and so forth.

The network 104 also includes a tenant access management system 108 for managing and providing the user 102 with access to various resources or services associated with the multiple tenant systems 106a-106n. The tenant access management system 108 can be software, hardware, firmware, or a combination of these. In some embodiments, the tenant access management system 108 can be a fully automatic machine based system. In alternative embodiments, the tenant access management system 108 can be a partial automatic or partial machine based system and/or may have one or more associated human operator for managing one or more functions/tasks of the tenant access management system 108. The tenant access management system 108 may be present on any device such as a server in the network 104. In some embodiments, each of the service providers 110a-110n includes the tenant access management system 108.

The tenant access management system 108 is configured to provide access to the user 102 based on the registration of the user 102 with respective tenant system(s) 106a-106n. The registration of the user 102 may be based on the identity information received from the user 102. The same identity information is associated with each of the multiple tenant systems 106a-106n for registering the user 102. The tenant access management system 108 may also create an account corresponding to each of the multiple tenant systems 106a-106n for the user 102.

Further, the tenant access management system 108 may assign a type of membership to the user 102 while registering the user 102 to the tenant systems 106a-106n. In some embodiments, the membership type can be a 'native membership' and/or an 'external membership'. Further one or more roles may be assigned to the user 102 based on the type of membership. The native membership is a permanent membership, and the user 102 having the native membership belongs permanently to a tenant system (e.g. 106a) of the tenant systems 106a-106n unless the user 102 unregisters from the respective tenant system (i.e. 106a). On the other hand, the external membership is a temporary membership and is revoked based on one or more conditions. Examples of the conditions includes, but are not limited to, timeframe, date, one or more events, and so forth. In some embodiments, when the user 102 is an external member than the user 102 may be allowed to perform one or more tasks on behalf of a native tenant, which can be another user. In some embodiments, the service providers 110a-110n may assign the type of membership to the user 102 based on a number of tasks, which the user 102 intend to perform in each of the multiple tenant systems 106a-106n.

After registration with one or more of the tenant systems 106a-106n the user 102 may become a tenant of the one or more of the tenant systems 106a-106n. Hereinafter, the user 102 registered to the tenant systems 106a-106n may be referred as the tenant 102. The tenant access management system 108 may allow the tenant 102 to access one or more tenant systems 106a-106n based on the identity information entered by the tenant 102. The tenant access management system 108 may authenticate the user 102 prior to providing access to the user 102 to the multiple tenant systems 106a-106n based on the identity information. The tenant 102 can access the multiple tenant systems 106a-106n by entering the same identity information. Hence, the tenant 102 is not required to remember multiple identity information for accessing the multiple tenant systems 106a-106n.

The tenant access management system 108 may provide the tenant 102 with a list of the tenant systems 106a-106n to which the tenant is registered, prior to allowing the tenant 102 to access the tenant systems 106a-106n. In some embodiments, the list of the tenant systems 106a-106n may be displayed on the device associated with the tenant 102. The tenant 102 can select one or more tenant systems 106a-106n from the displayed list of tenant systems 106a-106n. The tenant access management system 108 may allow the tenant 102 to access the one or more of the tenant systems 106a-106n based on the selection received from the user 102.

Figure 2:
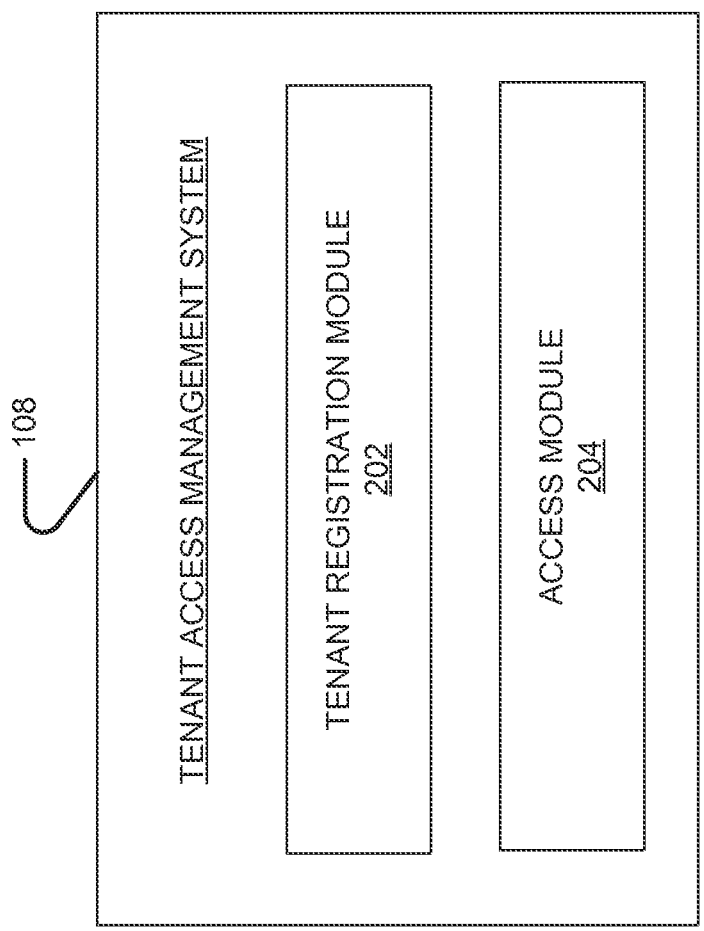
FIG. 2 is a block diagram illustrating various system elements of a tenant access management system.

FIG. 2 is a block diagram illustrating various system elements of tenant access management system 108 of FIG. 1. As discussed with reference to FIG. 1, the tenant access management system 108 may be located anywhere in the network 104 or may be present on any device connected to the network 104. The device can be a server present in the network 104. As shown, the tenant access management system 108 includes a tenant registration module 202 and an access module 204. The tenant registration module 202 can register the user 102 to multiple tenant systems 106a-106n based on an identity information received from the user 102. The same identity information is associated with each of the tenant systems 106a-106n. Hence, the user 102 is required to remember the same identity information for accessing the multiple tenant systems 106a-106n. The tenant registration module 202 can create an account corresponding to each of the tenant systems 106a-106n for the user 102.

The tenant registration module 202 also assigns a type of membership to the user 102 while registering the user 102 to the multiple tenant systems 106a-106n. The type of the membership can be such as, but not limited to, a 'native membership or an 'external membership'. The tenant registration module 202 assigns the type of membership to the user 102 based on tasks, which the user 102 intend to perform in each of the tenant systems. 106a-106n. When the user 102 has the native membership then the user 102 may belong permanently to a tenant system (e.g. 106a) of the tenant systems 106a-106n unless the user 102 unregisters from the tenant system (i.e. 106a). When the user 102 has an external membership of a tenant system then the user 102 is a temporary user of the tenant system. The external membership is a temporary membership and can be revoked based on one or more conditions, such as, time, date, one or more events, and so forth. The user 102 having the external membership may be allowed to perform one or more tasks on behalf of another native tenant in the tenant system (e.g. 106a).

Further, the tenant registration module 202 can assign one or more roles to the user 102 in the tenant systems 106a-106n based on the type of membership of the user 102. The rights of the user 102 in the multiple tenant system(s) 106a-106n may be controlled by the roles assigned or given to the user 102 in the context of a tenant system which can be different from the roles of the user 102 in another tenant system. For example, the user 102 may be a native member of the tenant system 106a and may be an external member of another tenant system 106b. Further, when the user 102 is logged in the context of a tenant system, such as the tenant system 106a, then the capacity of the user 102 is restricted by the rights associated with the roles of the user 102. In some embodiments, the user 102 can be given multiple roles in a membership. Further, the effective set of rights may be a union of all the rights of all the roles given to the user 102.

Further, the membership may also expire. For example, the native users memberships never expire by themselves until the user is deactivated in the tenant system or the user's individual memberships are removed. For external users, the membership can be given permanently or for specific period of time at the end of which the memberships can auto expire.

In an exemplary scenario, a user John owns two companies, a legal counseling firm who purchased hosted email services and, a travel consultant who purchased a hosted CRM application. John naturally belongs to both the companies and therefore John is native member of both tenant systems. John purchased the services from a service provider called 'could hosting incorporated'. The service provider has a specialized team to deal with email services and a separate one for provisioning customer support for CRM systems. Another user Mary is an email consultant given an external membership to legal counseling firm to configure email accounts of that tenant system. Another user Miss Eliza is a CRM expert having an external membership to the travel consultant tenant system. Mary and Eliza, both have native membership to the service provider account.

The access module 204 can allow the registered user 102 or the tenant 102 to access one or more of the tenant systems 106a-106n based on the identity information entered by the tenant 102. The tenant 102 may enter the identity information on an interface on the device associated with the user 102. The tenant 102 can access the resources or services of the multiple tenant systems 106a-106n by entering the same identity information. The access module 204 identifies or authorizes the user or tenant 102 in each of the tenant systems 106a-106n based on the same identity information. In some embodiments, the tenant 102 is given access to the resources or services of the multiple tenant systems 106a-106n post authentication. The access module 204 may also provide the registered user 102 with a list of the tenant systems 106a-106n prior to providing access to the user 102 to the tenant systems 106a-106n.

Further, the tenant systems 106a-106n are associated with a number of service providers 110a-110n. The registering of the user 102 is moderated and verified by the service providers 110a-110n. In some embodiments, each of the service provides 110a-110n may include the tenant registration module 202 and the access module 204.

Figure 3:
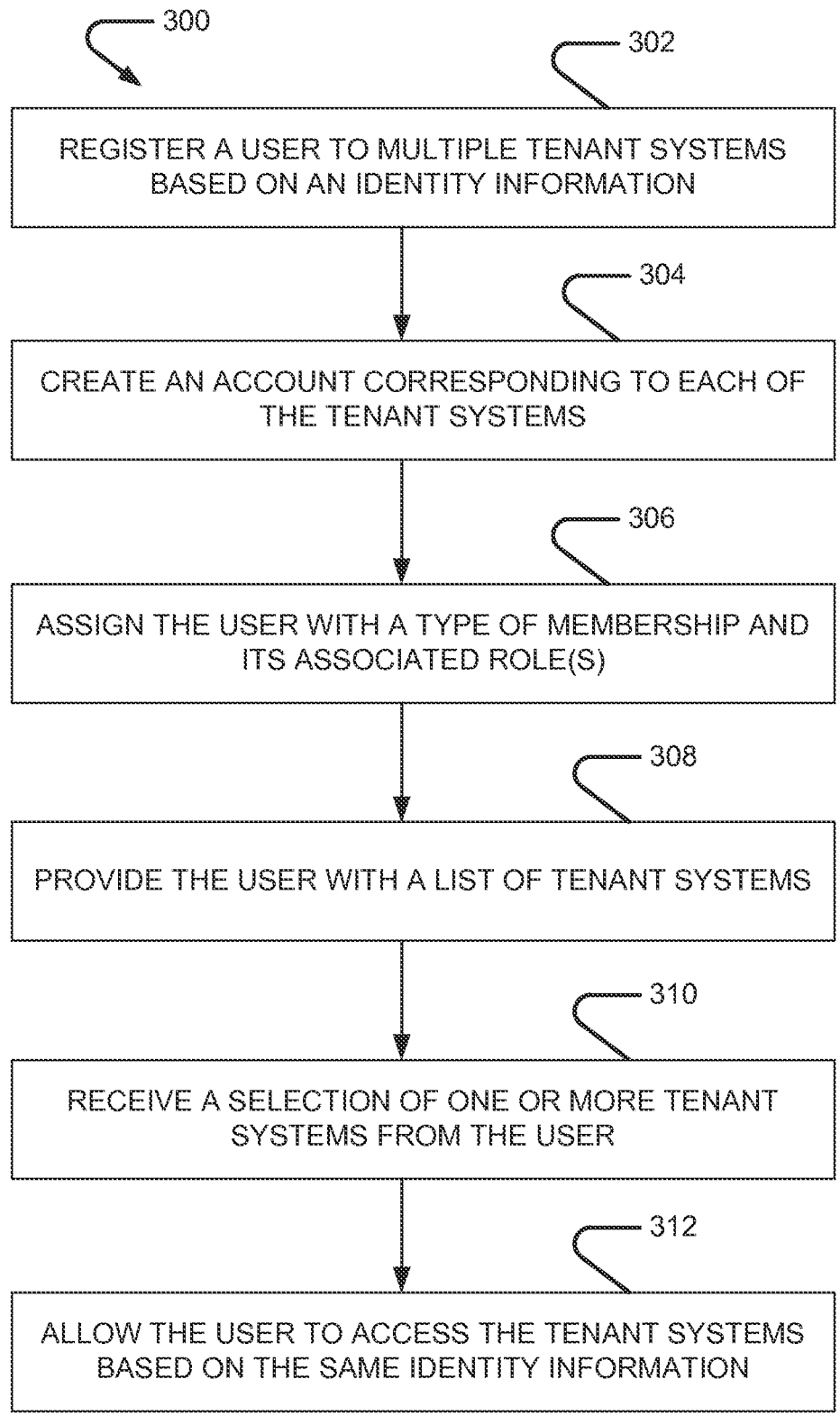
FIG. 3 is a flowchart illustrating a method for providing access to a user in a multi-tenant cloud environment, in accordance with some embodiments of the present disclosure.

FIG. 3 is a flowchart illustrating a method 300 for providing access to the user 102 to multiple tenant systems 106a-106n in a multi-tenant cloud environment 100, in accordance with some embodiments of the present disclosure. As discussed with reference to FIG. 1, the multi-tenant cloud environment 100 includes the user 102 which can be a member of the multiple tenant systems 106a-106n and can access the resources and services of the multiple tenant systems 106a-106n after becoming the member.

At step 302, the user 102 registers to one or more of the tenant systems 106a-106n by entering identity information. As discussed with reference to FIG. 2, the tenant registration module 202 of the tenant access management system 108 registers the user 102 to the one or more tenant systems 106a-106n. The identity information can include, but not limited to, username, password, and so forth. At step 304, the tenant registration module 202 creates an account corresponding to each of the one or more tenant systems 106a-106n for the user 102. Then at step 306, the tenant registration module 202 assigns the user 102 with a type of membership and associated roles. The user 102 may be assigned with different roles in different tenant systems 106a-106n. Further, corresponding to each of the memberships, the user 102 may be assigned with different specific roles.

At step 308, the access module 204 provides the user 102 with a list of tenant systems 106a-106n to which the user 102 is registered. The list of the tenant systems 106a-106n may be displayed at a device associated with the user 102. The device can be a laptop, a smart phone, a computer, and so forth. At step 310, the access module 204 receives a selection of the one or more of the tenant systems 106a-106n from the user 102. Thereafter, at step 312, the access module 204 allows the user 102 to access the multiple tenant systems 106a-106n based on the same identity information. The access module 204 authenticates the user 102 based on the same identity information prior to allowing the access to any of the tenant systems 106a-106n.

In accordance with presently disclosed subject matter, in the multi-tenant cloud environment, the user is created as an entity that is independent of the tenant system(s) or the service provider(s) the user belongs to. The user can be given memberships to multiple tenant systems based on the tasks the user needs to perform in respective tenant systems. Further, the user having one login account to a tenant system can be given membership to an unlimited set of tenant systems in the multi-tenant cloud environment. Therefore, the user have to remember only one login credential or identity information, and based on membership of the user in each of the tenant systems, the user can gain access to multiple tenant systems with specific rights to perform certain tasks.

In some embodiments, a service provider runs a cloud service broker platform that facilitates the transaction between the service vendors and an end user, reseller, retailer, etc., such as by using an integration application or API connector for each cloud service. The cloud service broker platform provides a single portal for access to multiple services. The cloud service broker platform supports multitenancy, which dramatically reduces the complexities by introducing two concepts:
1. Membership of a user in a tenant
2. Native vs external users of a tenant By virtue of these concepts, the user does not need to remember multiple credentials nor he needs to be given impersonation rights or digital certificates to access the cloud service broker platform.

The Tenant Structure in Hosted Multitenant Environment

In a hosted multi-tenant environment, a service provider, who owns the cloud service broker platform, creates a tenant account for every business entity who participates in the cloud service broker platform. These business entities may be of several types, such as:
  1) Vendor—the one who produces the products or services and wants their products or services to be available for sale in the cloud service broker platform;
  2) Agents—entities who facilitate sales of the products or services;
  3) Resellers or Distributors—are the channels through which the service provider wants to reach the customers;
  4) Customers—are the ones who actually consume the products and services.

Often these entity structures are represented as a hierarchy or tree. A set of customer entities could belong to a specific distributor or a reseller, and other resellers in the system may not have access to them.

Membership

In the cloud service broker platform of the present disclosure, a membership is defined as a role a user can play in a given tenant. While prior art multitenant systems treat a user as synonymous to a membership, the cloud service broker platform of the present disclosure implements a distinction between the two. A user in the cloud service broker platform of the present disclosure is not inherently attached to a tenant entity and therefore it can be attached to any number of tenants based on its roles in each tenant.

One user, having one login and password (and/or other access credentials) to gain access to the cloud service broker platform, can be given memberships to an unlimited number of tenants. The user would have to remember only one login and password, and based on memberships, he can gain access to multiple tenants with specific rights to perform certain tasks within each tenant.

Figure 4:
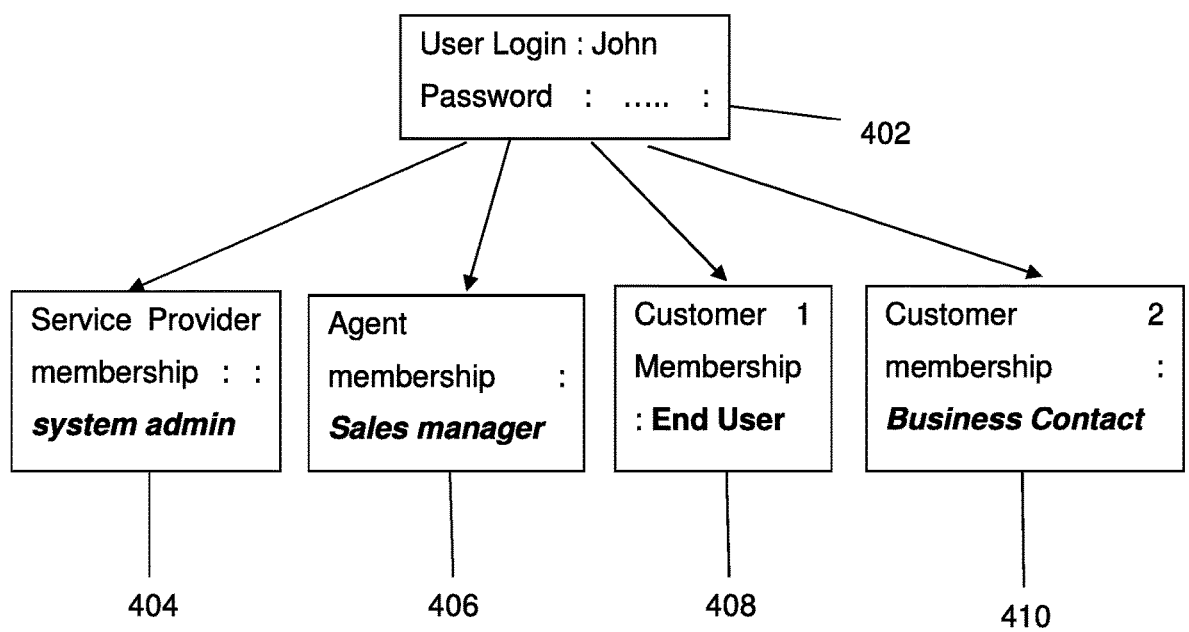
FIG. 4 is a schematic diagram illustrating the assignment of memberships and roles to a user in a multi-tenant cloud environment, in accordance with some embodiments of the present disclosure.

For example, and with reference to FIG. 4, John is a user in the cloud service broker platform of the present disclosure and has a username and password that allow him access to the cloud service broker platform at 402. John could play certain roles in different tenants as depicted in FIG. 4. For example, within the service provider 404, John may be designated as a system administrator. Within the agent 406, John may be designated as a sales manager. Within the customer 408, John may be designated as an end user. Within the customer 410, John may be designated as a business contact. In the cloud service broker platform of the present disclosure, John is able to use just one set of credentials to gain access to all four roles, one in each tenant. Each of these associations of the user John in the cloud service broker platform is designated a "membership".

It will be appreciated that the management of roles and memberships of users in the multi-tenant cloud service broker platform disclosed herein is much different than the prior art so-called "single sign on (SSO)" systems. SSO entails reusing authentication data for authenticating a user in different systems or services. In the multi-tenant cloud service broker platform of the present disclosure, the user signs in to a single system and this system authenticates the user once at the beginning of the user's interaction with the system. The system then employs the mechanism of membership and roles to give the system and users of the system flexible access to various tenants inside a single system. In other words, the system resolves the complex definition bound to each user where any particular user may have roles and memberships that are different with respect to the various tenants of the system. Each user may or may not have membership in (access to) a particular tenant. If the user does have membership in a particular tenant, the user's role within one tenant may be different than that user's role within other tenants in which the user has membership.

Native vs External Users

Memberships are of two types:
  1) Native: implies that the user naturally belongs to this tenant or organization. Unless he leaves the organization, the membership in this tenant is a permanent one. When a user is created in the cloud service broker platform, it is given one native membership in a chosen tenant entity.
  2) External: implies that the user is given a membership to perform certain tasks on behalf of the tenant or organization in which he does not a native membership.

His membership could be revoked based on changes in his job profile. External memberships are given after the user is created with at least one native membership.

A user is deleted from the cloud service broker platform when all its memberships are removed. A user must have at least one native membership and may have zero or more external memberships in the cloud service broker platform.

For example, suppose John owns two companies, a Legal Counselling Firm who purchased hosted Email services in the cloud service broker platform and, a Travel Consultant who purchased a hosted CRM application in the cloud service broker platform. John naturally belongs to both of the companies as a legitimate user who will consume the purchased services, and therefore he should be native members of both tenants that represent both of his companies (Customers).

John purchased the services from a Service Provider called Cloud Hosting Incorporated. The Service Provider has a specialized team to deal with Email services and a separate one for provisioning customer support for CRM systems.

Mary is an email consultant appointed by the Service Provider to help John setup emails for his employees. Mary therefore is given an external membership to the Legal Counselling Firm tenant to configure email accounts of that tenant. Being an external member, there are certain restrictions on Mary such as she herself cannot consume the Email service John has purchased.

Eliza is a CRM expert appointed by the Service Provider to help John setup a CRM system for the Travel Consultant. Eliza therefore is given an external membership to the Travel Consultant tenant. Eliza cannot consume the CRM services, but can help other users of that tenant to consume the CRM services.

a. Mary and Eliza, both have native membership to the Service Provider account because they naturally belong to that entity as employees of the Service Provider.

Users with multiple memberships can login to the system using a single username and password. Upon login or at the time of login, the user can designate the tenant in which he/she intends to work while using the cloud service broker platform.

Figure 5:
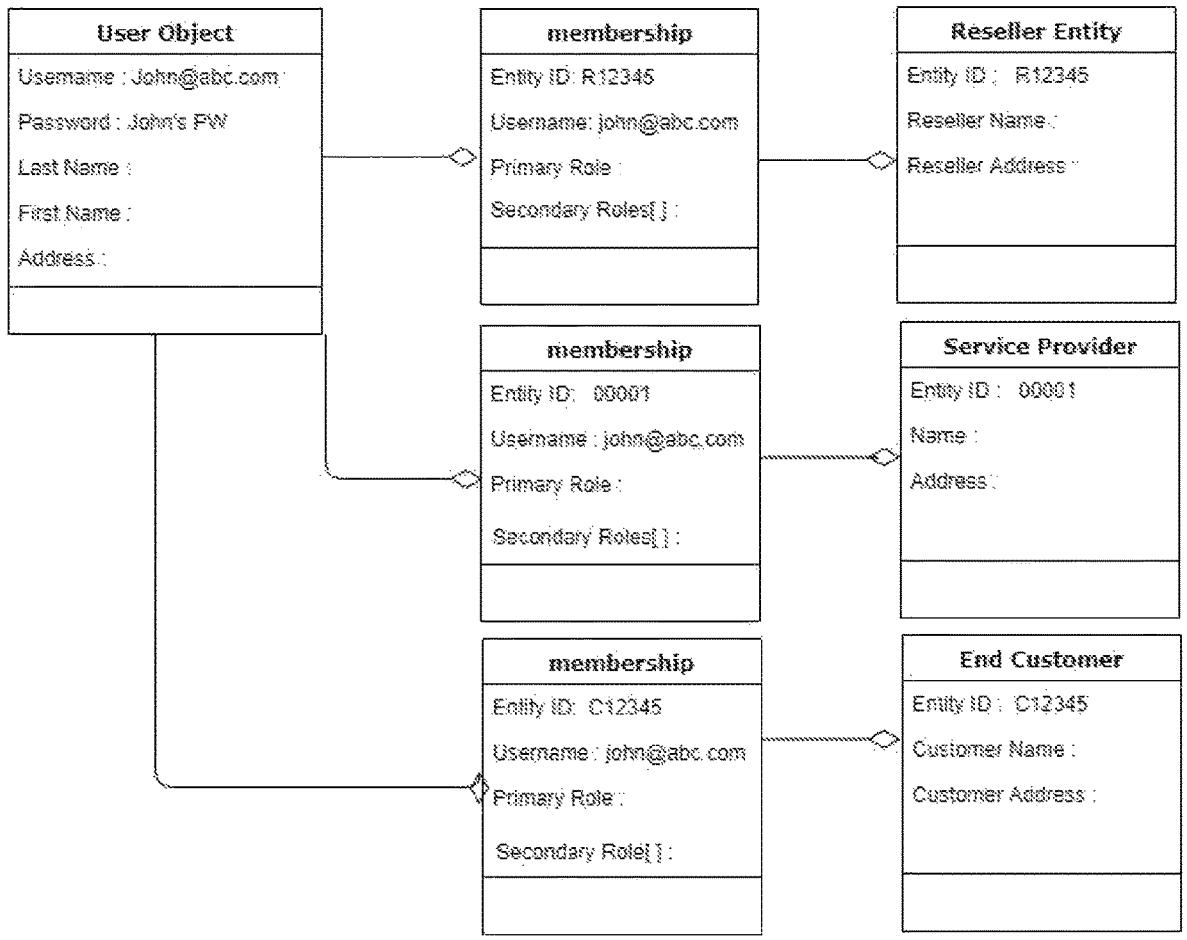
FIG. 5 is a schematic diagram illustrating the assignment of memberships and roles to a user in a multi-tenant cloud environment, in accordance with some embodiments of the present disclosure.

Database Objects:

In prior art systems, the user objects and the entity objects have a 1:1 relationship. In the cloud service broker platform of the present disclosure, user objects and the entity objects have a 1:N (where N is an integer) relationship. In the example illustrated in FIG. 5, john@abc.com is a user who has memberships in one Service Provider tenant, one Reseller tenant and one Customer tenant. Under each membership, john@abc.com may have different roles assigned to him.

Roles for Membership

One feature of membership is the ability to assign a role to a user, where the role is only valid in the context of the user's membership in a specific tenant entity. Each user can be given a role that enables his/her membership to a specific tenant. When the user has logged in the context of that tenant, his capacity is restricted by the rights conferred by his/her role in the context of that tenant. A user can even be given multiple roles in a membership. The effective set of rights is the union of all the rights of all the roles given to the user in the membership to that tenant. The ability to assign multiple roles helps stop the proliferation of roles and thus helps manage roles within the cloud service broker platform effectively. For example, suppose there are users in an End Customer tenant who act at the technical point of contact (Role: TechContact), having rights to configure services or receive technical notification, etc. Similarly, there are also users who are the business point of contact (Role: BizContact) who receive invoices and make payments. However, in many smaller organizations, the same user plays both the roles. The cloud service broker platform of the present disclosure allows the assignment of TechContact and BizContact roles to this user at the same time, and thus avoid creating a third role to represent a combination of these roles.

Expiration of Memberships

For native users, memberships don't expire by themselves until the user is deactivated in the cloud service broker platform, or his individual memberships are removed. For external users, membership can be given for specific period of time, at the end of which the membership will auto expire, or membership can be configured to be permanent. A typical use case would be as follows: A system administrator of the Service Provider (who has a native membership to the Service Provider tenant) needs to be given a technical configuration role for the system administrator's external membership in a Customer tenant for a limited period of time to allow the system administrator to configure services for the Customer Sequence of Actions of a User with Multiple Memberships 1) When John@abc.com, having memberships in several tenant entities, wants to access the cloud service broker platform, he performs the following set of activities: He visits the login page of the application, which is same for every user in the multitenant system, regardless of which and how many memberships a user has.

2) He provides a username and password (or other credentials) and the cloud service broker platform thereafter executes the following actions:

a. Identify all the active memberships of john@abc.com. Deactivated memberships (if any) are ignored. If john@abc.com has no active membership, he will be denied logon.

b. Form the set of active memberships for john@abc.com, Identify the memberships which have the maximum authority. In some embodiments of the cloud service broker platform, some entities are considered to have higher authority than others. For example, the Service Provider may have the highest authority, followed by Resellers, Agents and Customers.

c. If john@abc.com has an active membership in a Service Provider tenant entity, use the same to identify his role in that entity and present him with the dashboard that is commensurate with John's role in the Service Provider entity.

d. Else, if john@abc.com has Reseller memberships, then the following situations may arise:
      i. He has exactly one active Reseller membership: present him the dashboard of that entity as a Reseller user.
      ii. He has more than one active Reseller memberships: Present him with the choice of all the Reseller entities to which he has an active membership and let him choose the entity he wants to work with.

e. The same process is followed for the entities of lower authority, such as Agents and Customers.

Switching of Tenant Entity Context without Logging Out

1) By virtue of the multi-membership feature, a user who has already logged into the cloud service broker platform can switch context to another tenant without logging out and logging in again. This is possible because of two key implementations of the cloud service broker platform as already discussed hereinabove. The users are given only one set of credentials;

2) Once the user has logged in, the session of the cloud service broker platform remembers that the user is already authenticated and therefore can freely navigate (i.e., switch context) to other tenant entities.

While switching context, the user can see or search for all the entities in which he/she has memberships and select the one he/she wants to work under.

System Diagram

Figure 6:
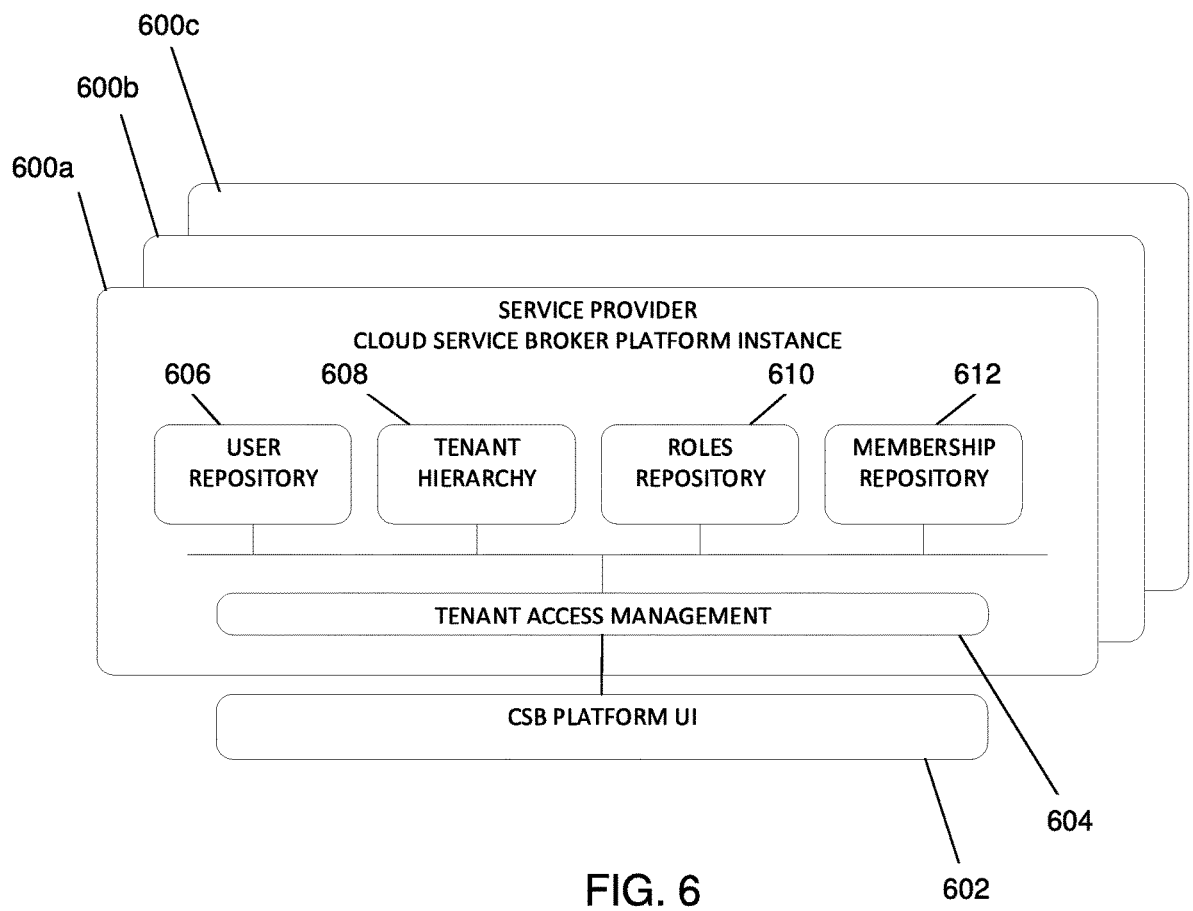
FIG. 6 is a schematic diagram illustrating tenant access management in a multi-tenant cloud environment, in accordance with some embodiments of the present disclosure.

With reference to FIG. 6, there is illustrated a schematic system diagram illustrating access management in multiple instances (600*a*, 600*b*, 600*c*, etc.) of the cloud service broker platform of the present disclosure. The user interacts with the cloud service broker platform via the user interface 602. It is through the user interface that the user enters the username and password (or other credentials) to gain access to the cloud service broker platform. Tenant access management functionality 604 of the cloud service broker platform evaluates the user credentials to determine if the user is authorized to access the cloud service broker platform and, if so, which tenants the user has membership in, the hierarchy of those tenants, and the user's role(s) within each tenant. For this purpose, the tenant access management functionality 604 has access to databases User Repository 606, Tenant Hierarchy 608, Roles Repository 610, and Membership Repository 612. Once the tenant memberships and roles for the user are determined, the user can be presented with appropriate dashboards or other information displays through the cloud service broker platform user interface 602.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

The above specification provides a description of the manufacture and use of the invention. Since many embodiments of the invention can be made without departing from the spirit and scope of the invention, the invention also resides in the claims hereinafter appended.

What is claimed is:

1. A method for allowing one or more users to access a plurality of tenant systems in a multi-tenant cloud environment, the method comprising:
   registering a user to access the plurality of tenant systems based on an identity information received from the user, wherein the same identity information is used for identifying the user in each of the plurality of tenant systems;
   assigning the user a type of membership from one or more types of membership in each tenant system of the plurality of tenant systems, wherein the types of membership comprise at least one of a native membership or an external membership, wherein the external membership is a temporary membership and is revoked based on one or more conditions, wherein the user having the external membership is allowed to perform one or more tasks on behalf of a native tenant;
   receiving input of the identity information from the user;
   upon receiving the identity information from the user, providing the user with a list of the plurality of tenant systems associated to the identity information prior to allowing the user to access any of the plurality of tenant systems, wherein one or more roles are assigned to the user based on the type of membership of the user;
   receiving a selection of one or more of the plurality of tenant systems from the user;
   allowing the user to access the one or more selected tenant systems of the plurality of tenant systems based on the selection received from the user and the type of membership corresponding to the one or more selected tenant systems.

2. The method of claim 1, wherein the native membership is a permanent membership, wherein the user having the native membership belongs permanently to a tenant system of the plurality of tenant systems unless the user unregisters from the tenant system.

3. The method of claim 1, wherein the plurality of tenant systems are associated with a plurality of service providers.

4. The method of claim 3, wherein the registering of the user is moderated and verified by the plurality of service providers associated with the plurality of tenant systems.

5. The method of claim 4, wherein the plurality of service providers associated with the plurality of tenant systems assigns the type of membership to the user based on a plurality of tasks, which the user intend to perform in each of the plurality of tenant systems.

6. A tenant access management system for allowing one or more users to access a plurality of tenant systems in a multi-tenant cloud environment, the system comprising:
   a tenant registration module comprising hardware and at least one of software and firmware;
   the tenant registration module configured for:
      registering a user to access the plurality of tenant systems based on an identity information received from the user, wherein the same identity information is used for identifying the user in each of the plurality of tenant systems; and
      assigning the user a type of membership from one or more types of membership, the types of membership comprising at least one of a native membership or an external membership, wherein the external membership is a temporary membership and is revoked based on one or more conditions, wherein the user having the external membership is allowed to perform one or more tasks on behalf of a native tenant;
      assigning one or more roles to the user based on the type of membership of the user;
   an access module comprising hardware and at least one of software and firmware;
   the access module configured for:
      receiving input of the identity information from the user;
      upon receiving the identity information from the user, providing the user with a list of the plurality of tenant systems prior to allowing the user to access any of the plurality of tenant systems;
      receiving a selection of one or more of the plurality of tenant systems from the user;

allowing the user to access the one or more selected tenant systems of the plurality of tenant systems based on the selection received from the user;

wherein the user's rights in a given one of the plurality of tenant systems are controlled by the roles given to each of the users in the context of that tenant system which can be different from the user's roles in another tenant system.

7. The system of claim 6, wherein the native membership is a permanent membership, wherein the user having the native membership belongs permanently to a tenant system of the plurality of tenant systems unless the user unregisters from the tenant system.

8. The system of claim 6, wherein the plurality of tenant systems are associated with a plurality of service providers.

9. The system of claim 8, wherein the registering of the user is moderated and verified by the plurality of service providers associated with the plurality of tenant systems, further wherein each of the plurality of service providers comprises the tenant registration module and the access module.

10. The system of claim 9, wherein tenant registration module is configured for assigning the type of membership to the user based on a plurality of tasks the user intends to perform in each of the plurality of tenant systems.

* * * * *